US009213579B2

(12) United States Patent
Allam et al.

(10) Patent No.: US 9,213,579 B2
(45) Date of Patent: Dec. 15, 2015

(54) SOFTWARE COMPONENT PLACEMENT ON EXECUTION PLATFORMS

(75) Inventors: Abdul Allam, Raleigh, NC (US); Larry Dennis Steck, Jr., Rochester, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 696 days.

(21) Appl. No.: 13/247,026

(22) Filed: Sep. 28, 2011

(65) Prior Publication Data

US 2013/0080996 A1    Mar. 28, 2013

(51) Int. Cl.
*G06F 9/44* (2006.01)
*G06F 9/50* (2006.01)

(52) U.S. Cl.
CPC .................................. *G06F 9/5066* (2013.01)

(58) Field of Classification Search
CPC ......... G06F 9/44; G06F 8/61; G06F 11/3447; G06F 11/3471
USPC ....................................................... 717/120
See application file for complete search history.

(56) References Cited

U.S. PATENT DOCUMENTS

| 7,849,188 B2 | 12/2010 | Yu |
| 7,870,184 B2 | 1/2011 | Bauer et al. |
| 2006/0195840 A1* | 8/2006 | Sundarrajan et al. ......... 717/176 |
| 2007/0043531 A1* | 2/2007 | Kosche et al. ................. 702/182 |
| 2009/0171703 A1* | 7/2009 | Bobak et al. ...................... 705/7 |
| 2010/0023582 A1* | 1/2010 | Pedersen et al. .............. 709/203 |
| 2010/0161629 A1 | 6/2010 | Palanisamy et al. |
| 2010/0199260 A1 | 8/2010 | Duggal et al. |
| 2012/0151469 A1* | 6/2012 | Wookey ........................ 717/175 |

FOREIGN PATENT DOCUMENTS

WO    2008124156 A1    10/2008

OTHER PUBLICATIONS

Perepletchikov et al., "Comparing the Impact of Service-Oriented and Object-Oriented paradigms on the Structural Properties of Software," Second International Workshop on Modeling Inter-Organization systems, 2005. Ayia Napa, Cyprus.*
Alefragis et al., "BAL: A language for component based distributed applications development," 2009 35th euromicro Conference on Software Engineering and Advanced Applications, 486-489.*

(Continued)

*Primary Examiner* — Wei Zhen
*Assistant Examiner* — Mohammed Huda
(74) *Attorney, Agent, or Firm* — Garg Law Firm, PLLC; Rakesh Garg; Mark C. Vallone

(57) ABSTRACT

A method, system, and computer program product for improving software component placement on software execution platforms are provided in the illustrative embodiments. A computer determines whether a code corresponding to the software component includes business process logic. The computer determines a granularity level of the code. The granularity level of the code is a categorization of the code according to whether a number of external references in the code exceed a threshold value. The computer, responsive to determining the granularity level of the code, recommends placement of a first portion of the code on a first platform in the set of software execution platforms.

20 Claims, 6 Drawing Sheets

(56) References Cited

OTHER PUBLICATIONS

Perepletchikov et al.., "The Impact of Software Development Strategies on Project and Structural software Attributes in SOA," Proceedings of OTM Workshops '2005 pp. 442-451.
Seinturier et al., "Reconfigurable SCA Applications with the FraSCAti Platorm," 6th IEEE International Conference on Service Computing (SCC'09) 2009 268-275.
Curbera et al., "Colombo: Lightweight middleware for service-oriented computing," IBM Systems Journal, vol. 44, No. 4, 2005, 799-819.
IBM, Code quality, Static and dynamic code testing solutions, IBM Code quality and embedded systems testing—Rational.
IBM, Rational Logiscope, IBM—Rational Logiscope—Rational Logiscope—Software.
IBM, Rational Test RealTime, IBM—Rational Test RealTime—Features and benefits.
IBM, Software Analyzer, IBM Software—Software Analyzer.

* cited by examiner

SOFTWARE COMPONENT PLACEMENT ON EXECUTION PLATFORMS

TECHNICAL FIELD

The present invention relates generally to a method, system, and computer program product for improving performance of a data processing environment. More particularly, the present invention relates to a method, system, and computer program product for improving the placement of software components on recommended software execution platforms in a data processing environment.

BACKGROUND

A data processing environment includes systems for executing code containing functional logic. A data processing environment for executing medium to large scale software applications typically includes a variety of software execution platforms (platforms, execution platforms). A platform is an application infrastructure, such as a type of server hardware, software, or a combination thereof, for executing software of a certain type. Typically, a platform is designed to provide the services needed for executing the software of that type, and to provide them in an efficient manner. Provision of specific services in this manner is known as "separation of concerns."

Often, a platform does not exclude software from execution merely because the software is not of the type for which the platform is best suited. Furthermore, many software applications that execute in a data processing environment include functions that are not clearly attributable to one platform or another.

Presently available software development tools are typically designed and used for improving code quality, and shortening development time. Software developers typically tend to have more expertise in a limited number of functional areas rather than all areas of "concern" in a given data processing environment. For example, one software developer may be a database expert whereas another may be an expert in a particular business process, such as transaction processing in a banking application.

SUMMARY

The illustrative embodiments provide a method, system, and computer program product for improving software component placement on software execution platforms.

In an embodiment, a computer determines whether a code corresponding to the software component includes business process logic. The computer determines a granularity level of the code. The granularity level of the code is a categorization of the code according to whether a number of external references in the code exceed a threshold value. The computer, responsive to determining the granularity level of the code, recommends placement of a first portion of the code on a first platform in the set of software execution platforms.

Another embodiment includes one or more computer-readable, tangible storage devices. The embodiment further includes program instructions, stored on at least one of the one or more storage devices, to determine whether a code corresponding to the software component includes business process logic. The embodiment further includes program instructions, stored on at least one of the one or more storage devices, to determine a granularity level of the code. The embodiment further includes program instructions, stored on at least one of the one or more storage devices, to, responsive to determining the granularity level of the code, recommend placement of a first portion of the code on a first platform in the set of software execution platforms.

Another embodiment includes, one or more processors, one or more computer-readable memories and one or more computer-readable, tangible storage devices. The embodiment further includes program instructions, stored on at least one of the one or more storage devices, to determine whether a code corresponding to the software component includes business process logic. The embodiment further includes program instructions, stored on at least one of the one or more storage devices, to determine a granularity level of the code. The embodiment further includes program instructions, stored on at least one of the one or more storage devices, to, responsive to determining the granularity level of the code, recommend placement of a first portion of the code on a first platform in the set of software execution platforms.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

DETAILED DESCRIPTION

Figure 1:
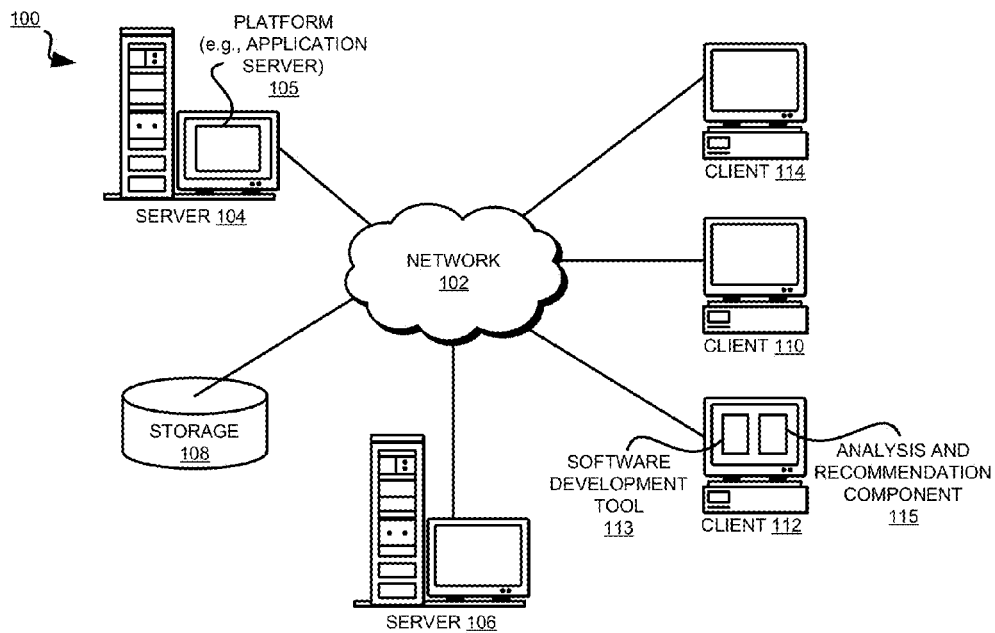
FIG. 1 depicts a pictorial representation of a network of data processing systems in which illustrative embodiments may be implemented.

One of the objectives of service oriented architecture (SOA) is business agility, which benefits from software components being implemented on execution platforms with relevant separation of concerns. The embodiments of the invention recognize that often this principle of separation of concern is not enforced in software development, software deployment, or both.

The embodiments recognize that deploying a software component on an inappropriate platform (other than best-fit platform) results in degraded performance of the software component or of the platform and other software components executing thereon as a whole. For example, often a software component implementing logic of a business process is deployed on an integration platform. An integration platform is a platform that provides integration or interconnectivity between software components executing on other data processing systems. As another example, a software component providing database connectivity logic is often, undesirably, implemented on a process flow engine, such as an application server platform.

Performance degradation and other undesirable behavior of a software component or a platform can result from improper development, improper deployment, or both. In this disclosure, the "placement" of a software component refers to forming an association between a software component and a platform either in the development of the component, or in the deployment of the component, or both. Improper placement refers to placement that is contrary to the known best practices, preferences, or specifications, for deploying various software components on various platforms.

The embodiments further recognize that presently, attempts to detect improper placement of software components on platforms are undertaken after a platform or software component begins to exhibit signs of performance degradation. Only after the undesirable effects of improper placement are observed, attempts are made to analyze the code of the software components to determine whether the software components have been implemented on the wrong platform.

Presently available tools for improving code quality can shorten development time and reduce development costs. However, such tools normally only perform analyses such as structural analysis, coding standards compliance, complexity analysis, memory leak detection, performance profiling, test coverage measurement, and effects of code refactoring. Such analyses are insufficient for determining whether the placement is proper for the code of the software component.

Furthermore, such analyses cannot predict the effects of improper placement due to deployment of an otherwise efficient software component on an improper platform. Certain presently available tools also perform component testing. However, these other tools also focus on code quality rather than the improper placement problem.

The illustrative embodiments used to describe the invention generally address and solve the above-described problems and other problems related to placement of software components. The illustrative embodiments provide a method, system, and computer program product for improving software placement on software execution platforms.

Generally, an embodiment of the invention provides an improved technique that can be implemented in conjunction with existing software development tools and software deployment tools. An embodiment can analyze the code of a software component from several placement related criteria and recommend appropriate platform choice.

For example, an embodiment can distinguish between business process related logic or code, and non-business-process related logic or code. As another example, an embodiment can determine whether the logic of the code is fine grained, for example, implementation of a business process functionality, or coarse grained, for example, referencing an implementation of a business process functionality that is implemented elsewhere. As another example, an embodiment can determine whether a software component includes connectivity logic, for example, code for connecting to a database or another type of data source. As another example, an embodiment can determine whether a software component includes non-business-process logic, such as instrumentation for debugging, error reporting, and performance metrics measurement.

These analysis features are described only as examples without implying any limitation on the invention. Those of ordinary skill in the art will be able to conceive many other types of analyses for similar purposes from this disclosure and the same are contemplated within the scope of the illustrative embodiments.

An embodiment can be implemented in existing software development, deployment, or analysis tools. An embodiment can provide recommendations for improving the placement of the various software components on the various platforms in a data processing environment based on best practices and performance considerations. An embodiment can perform the above-described analyses and other similar analyses without requiring resources knowledgeable in all aspects of business logic, process flow logic, integration logic, or platform technologies. An embodiment may increase productivity of a platform as a whole when placement changes are made as suggested by the analysis and recommendation.

The illustrative embodiments are described with respect to certain data, data structures, file-systems, file names, directories, and paths only as examples. Such descriptions are not intended to be limiting on the invention.

Furthermore, the illustrative embodiments may be implemented with respect to any type of data, data source, or access to a data source over a data network. Any type of data application or storage device may provide the data, such as data from a database, a flat file, an index file, or any data repository in general, to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, logic constructs such as if-then-else constructs, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle Corporation and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
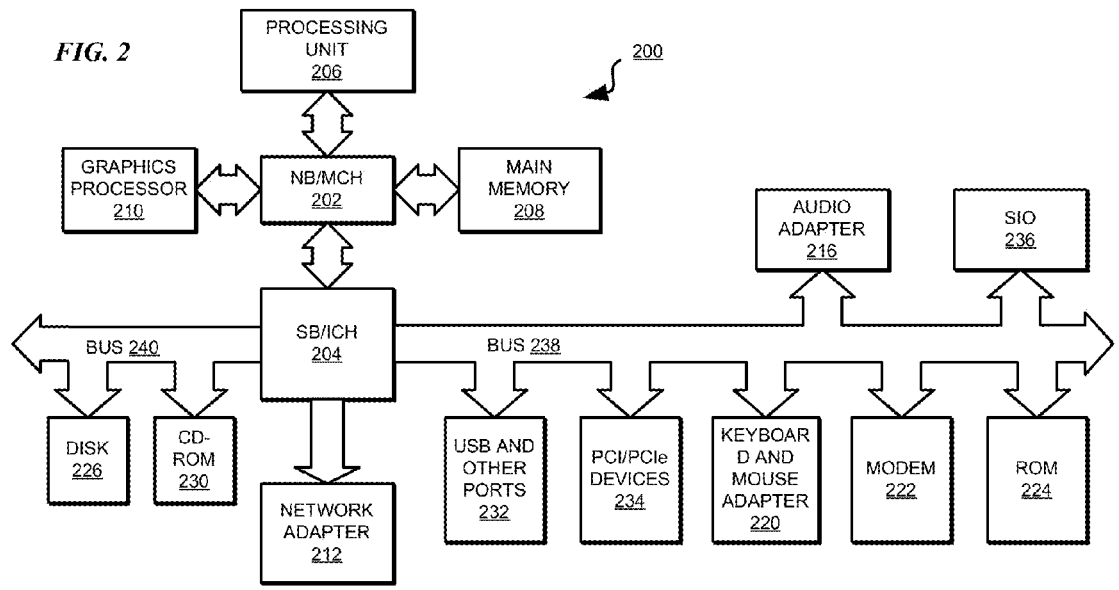
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

As an example, server 104 may include platform 105, which, for example, may be an application server platform, or an integration services platform. Client 112 may include example software development tool 113 and analysis and recommendation component 115. Analysis and recommendation component 115 may implement an embodiment. Analysis and recommendation component 115 can be used to improve software development tool 113, or a software deployment tool in client 112 (not shown) to improve the placement of software components on platform 105 in data processing environment 100. As an example, platform 105, software development tool 113, and analysis and recommendation component 115 according to an embodiment, may each be implemented as program instructions that can be stored using a data storage device and executed using a processor.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors or CPUs and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub (SB/ICH) 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on one or more storage devices, such as hard disk drive 226, and may be loaded into one or more memories, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
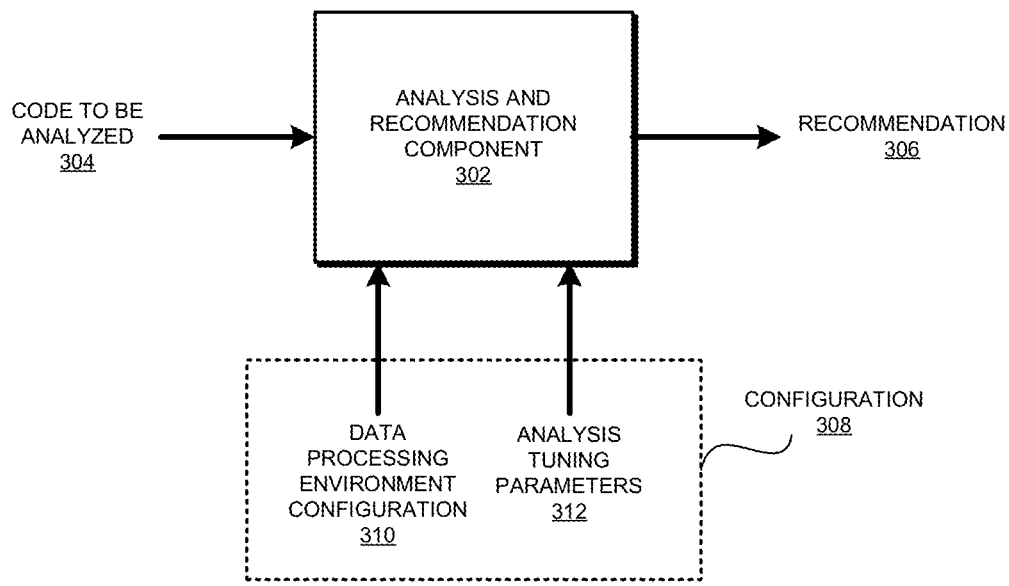
FIG. 3 depicts a block diagram of an analysis and recommendation component in accordance with an illustrative embodiment.

With reference to FIG. 3, this figure depicts a block diagram of an analysis and recommendation component in accordance with an illustrative embodiment. Analysis and recommendation component 302 may be implemented as analysis and recommendation component 115 in FIG. 1.

Analysis and recommendation component 302 receives code 304 that is to be analyzed for determining whether the software component including code 304 participates in a placement that is in accord with industry best practices, specific performance requirements, or a combination thereof. Analysis and recommendation component 302 generates recommendation 306, which includes recommendations for improved placement of the software component that includes code 304.

Recommendation 306 may include, for example, whether a certain portion of the code should be re-factored, i.e., separated into parts that can execute on separate platforms. As another example, recommendation 306 may include a suggestion to execute all or part of code 304 on a different platform from the platform on which code 304 may be presently deployed. As another example, recommendation 306 may include a suggestion to activate, deploy, or procure a particular type of platform to improve the execution efficiency of all or part of code 304. Many other recommendations in addition to these examples are described with respect to the various embodiments herein.

Configuration 308 may be any suitable manner of providing information usable in performing analysis and recommendation component 302's analysis and recommendation function. For example, in one embodiment, configuration 308 includes data processing environment configuration 310, which informs analysis and recommendation component 302 about the various platforms available in the given data processing environment. Using different data processing environment configurations 310, such an embodiment can alter recommendations 306 for the improved placement of all or part of code 304.

Data processing environment configuration 310 allows analysis and recommendation component 302 to be usable with a variety of code 304 in a variety of data processing environments that may include various combinations of platforms. For example, data processing environment configuration 310 may be used to specify that an integration platform and an application service platform are available in a given data processing environment. Data processing environment configuration 310 may further specify, as an example, that when the application service platform is operating at a certain utilization, deployment of code 304 on another instance of application service platform is preferable over leaving code 304 on the integration platform, or vice versa.

In an embodiment, configuration 308 further includes a set of analysis tuning parameters 312. A set of analysis tuning parameters 312 includes one or more analysis tuning parameters.

Different analysis tuning parameters 312 can tune or configure analysis and recommendation component 302's different analyses of code 304. For example, one type of analysis tuning parameter 312 may be a granularity threshold value. Analysis and recommendation component 312 may use such a granularity threshold value to determine whether a portion of code 304 is fine grained or coarse grained.

For example, assume that granularity threshold value is set to 10. Analysis and recommendation component 312 may analyze code 304 to determine whether code 304 makes 10 or more references to external objects from code 304. If code 304 makes less than 10 references, analysis and recommendation component 302 may regard code 304 as fine grained, otherwise coarse grained.

Note that analysis tuning parameters 312 are tunable, that is, adjustable according to the circumstances. For example, even a single reference to an external object may be sufficient to regard code 304 as coarse grained under one circumstance, whereas 100 references to external objects may not be sufficient to regard code 304 as coarse grained under a different circumstance, such as a different instance of code 304. Tunable parameters 312 allow analysis and recommendation component 302, among other things, the flexibility to accommodate various types of code 304, various data processing environments where code 304 may be deployed, various performance demands from such deployments, and various other considerations in the development of code 304.

Figure 4:
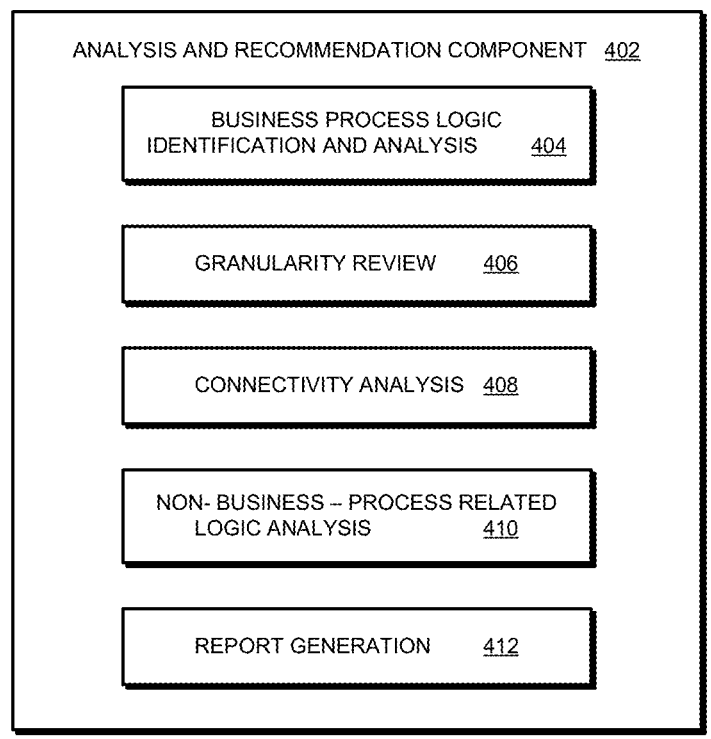
FIG. 4 depicts a block diagram of an example analysis and recommendation component in accordance with an illustrative embodiment.

With reference to FIG. 4, this figure depicts a block diagram of an example analysis and recommendation component in accordance with an illustrative embodiment. Analysis and recommendation component 402 may be used as analysis and recommendation component 302 in FIG. 3.

On a given software component, such as code 304 in FIG. 3, analysis and recommendation component 402 uses component 404 to perform business process logic identification and analysis. Component 406 provides granularity review function to analysis and recommendation component 402. Component 408 performs connectivity analysis on the subject software component. Component 410 performs non-business-process related logic analysis. Component 412 generates reports containing recommendations, such as recommendation 306 in FIG. 3. The functions of components 404-412 are described with respect to example embodiments depicted in FIGS. 5-9.

Figure 5:
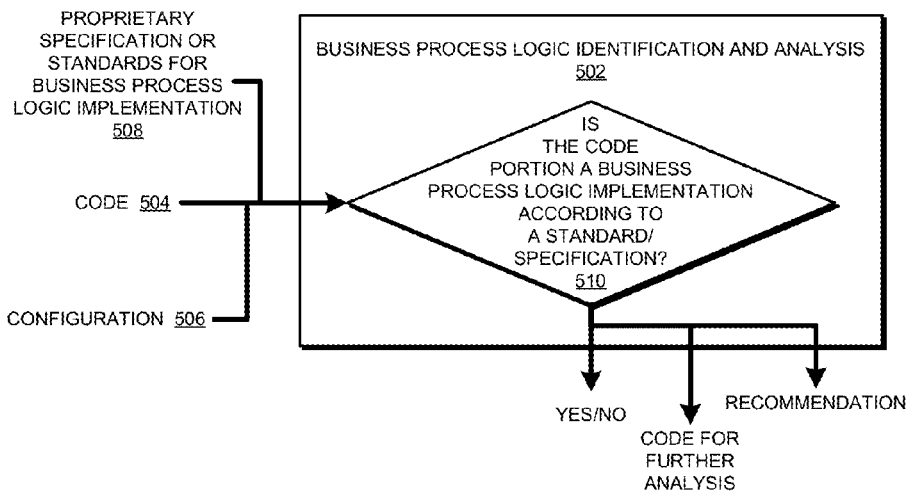
FIG. 5 depicts a block diagram of a business process logic identification and analysis component in accordance with an illustrative embodiment.

With reference to FIG. 5, this figure depicts a block diagram of a business process logic identification and analysis component in accordance with an illustrative embodiment. Business process logic identification and analysis component 502 may be used as business process logic identification and analysis component 404 in FIG. 4.

In one embodiment, business process logic identification and analysis component 502 receives code 504, such as code 304 in FIG. 3, as one input. Configuration 506 forms another input to business process logic identification and analysis component 502. In one embodiment, configuration 506 may be similar to configuration 308 in FIG. 3. In another embodiment, configuration 506 may be similar to a part of configuration 308 in FIG. 3, for example, one or more of analysis tuning parameters 312 in FIG. 3.

Input 508 includes one or more designations of manners of detecting a business process logic implementation. For example, input 508 may include a name or details of a standard that is used with code 504 to implement business process logic in code 504. For example, Business Process Execution language (BPEL) is a standard presently used for implementing business process logic in software components. Using this example, input 508 may include the name "BPEL", additional details, such as a specific version or variation of BPEL, or a combination thereof.

As another example, input 508 may include a name or details of a proprietary specification that is used with code 504 to implement business process logic in code 504. Of course, input 508 may include a combination of the name or details of standards and proprietary specifications that may be used with code 504 to implement business process logic in code 504.

Using inputs 504, 506, and 508, business process logic identification and analysis component 502 makes determination 510. Determination 510 may be a determination as to whether code 504 or a portion thereof is a business process logic implementation. For example, if input 508 specified BPEL as the standard for business process logic implementation in code 504, determination 510 could identify references in code 504 for a BPEL namespace declaration having a certain structure and content, e.g., "http://docs.oasis-open.org/wsbpel/2.0/process/executable", which specifies that the code implements business process logic.

Business process logic identification and analysis component 502 outputs a result of determination 510. In one embodiment, the result is a Boolean true/false (Yes, code 504 includes business process logic implementation, or not). In another embodiment, the result may also identify the portions of code 504 that include the business process logic implementation.

Business process logic identification and analysis component 502 may further output a recommendation based on determination 510. For example, in response to identifying the portion implementing a business process logic, business process logic identification and analysis component 502 may generate a recommendation that at least that portion of code 504 should execute on a specific type of platform, such as an application server platform.

In a sequence of analyses, business process logic identification and analysis component 502 may provide the analyzed version of code 504 to another analysis component of an analysis and recommendation component according to an embodiment. For example, business process logic identification and analysis component 502 may provide code for further analysis to granularity review component 406 in FIG. 4.

Figure 6:
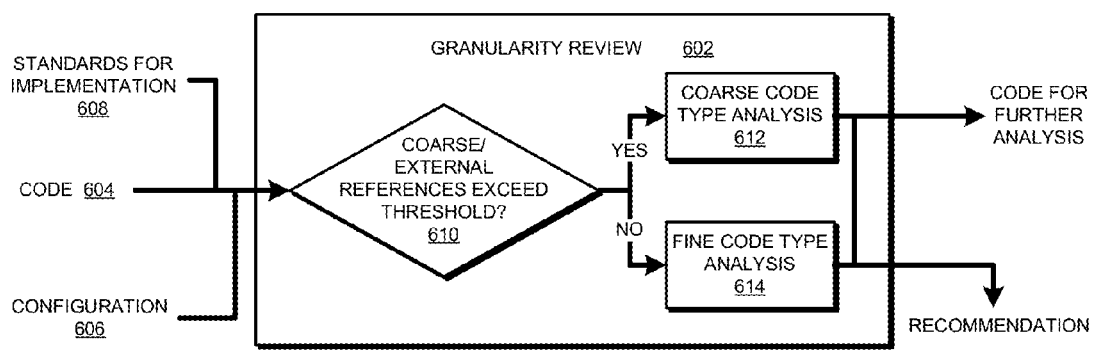
FIG. 6 depicts a block diagram of a granularity review component in accordance with an illustrative embodiment.

With reference to FIG. 6, this figure depicts a block diagram of a granularity review component in accordance with an illustrative embodiment. Granularity review component 602 may be used as granularity review component 406 in FIG. 4.

In one embodiment, granularity review component 602 receives code 604, such as code 304 in FIG. 3 or code for further analysis from business process logic identification and analysis component 502 in FIG. 5, as one input. Configuration 606 forms another input to granularity review component 602. In one embodiment, configuration 606 may be similar to configuration 308 in FIG. 3. In another embodiment, configuration 606 may be similar to a part of configuration 308 in FIG. 3, for example, one or more of analysis tuning parameters 312 in FIG. 3 including a granularity threshold value as described in an example in this disclosure.

Input 608 includes one or more designations of manners of detecting the granularity of code 604. For example, input 608 may include a specification for Java implementation in code 604. Such a specification allows granularity review component 602 to determine whether code 604 includes references to external Java objects.

As another example, input 608 may include details of a specification that allows granularity review component 602 to identify Java code in code 604. Of course, input 608 may include a combination of the name or details of any type or number of standards and specifications for implementation of code 604.

Using inputs 604, 606, and 608, granularity review component 602 makes determination 610. Determination 610 may be a determination as to whether code 604 or a portion thereof is coarse, for example, whether a portion of code 604 includes external references exceeding a threshold value. Granularity review component 602 can make this determination by examining whether a portion of code 604 complies with the implementation for referencing external Java objects as specified in input 608. Granularity review component 602 may then count the number of such external references to determine whether the count of external references in code 604 exceeds a threshold value.

For coarse portions of code 604, granularity review component 602 further performs coarse code type analysis 612. As in the example above, coarse code type analysis 612 in an embodiment includes determining whether the coarse granularity portion of code 604 includes Java code.

For fine granularity portions of code 604, such as where the code is not a reference to an external object but an implementation of the object logic, granularity review component 602 performs fine code type analysis 614. As an example, fine code type analysis 614 may test whether the fine granularity portion of code 604 is implemented in accordance with a standard in input 608. Again, as in an example above, input 608 may specify Java as the implementation standard for code 604, and fine code type analysis 614 may determine compliance therewith or make a recommendation for such compliance.

Coarse code type analysis 612 and fine code type analysis 614 may each produce one or more recommendations. For example, granularity review component 602 can recommend a placement on an application services platform for the portion of code 604 that includes fine grained code. In one embodiment, a recommendation from analysis 612 or 614 may also identify the portion of code 604 to which the recommendation pertains.

In addition to the recommendation, granularity review component 602 may also produce code for further review. As with business process logic identification and analysis component 502 in FIG. 5, in a sequence of analyses, granularity review component 602 may provide the analyzed version of code 604 to another analysis component of an analysis and recommendation component according to an embodiment. For example, granularity review component 602 may provide code for further analysis to connectivity analysis component 408 in FIG. 4.

Figure 7:
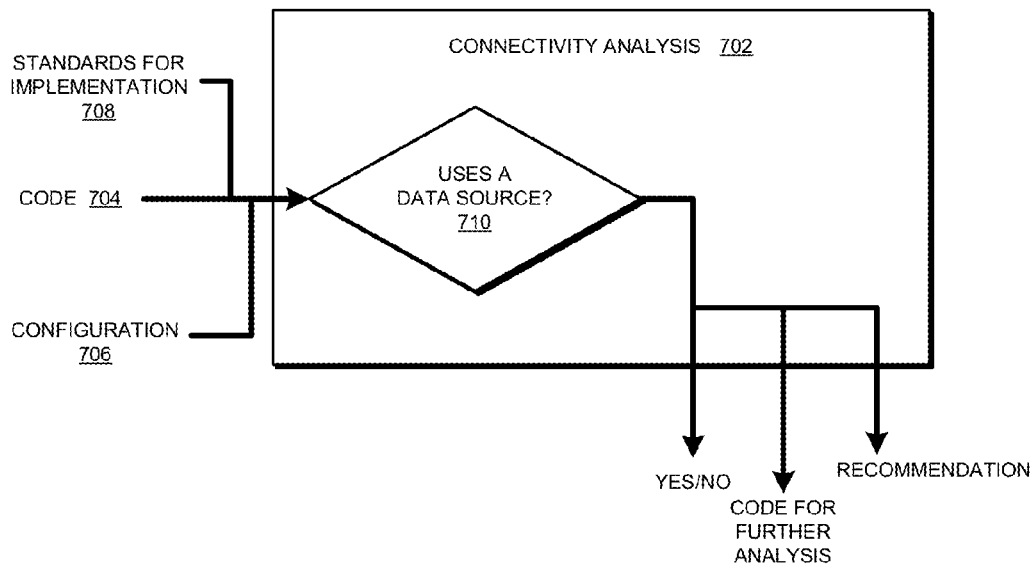
FIG. 7 depicts a block diagram of a connectivity analysis component in accordance with an illustrative embodiment.

With reference to FIG. 7, this figure depicts a block diagram of a connectivity analysis component in accordance with an illustrative embodiment. Connectivity analysis component 702 may be used as connectivity analysis component 408 in FIG. 4.

In one embodiment, connectivity analysis component 702 receives code 704, such as code 304 in FIG. 3 or code for further analysis from granularity review component 602 in FIG. 6, as one input. Configuration 706 forms another input to connectivity analysis component 702. In one embodiment, configuration 706 may be similar to configuration 308 in FIG. 3. In another embodiment, configuration 706 may be similar to a part of configuration 308 in FIG. 3, for example, one or more of analysis tuning parameters 312 in FIG. 3 including a connectivity threshold value. An example connectivity threshold value may specify a number of references to external data sources at or above which a portion of code 704 may be regarded as connectivity type code.

Input 708 includes one or more manners of detecting the connectivity portions in code 704. For example, input 708 may include a collection of data sources expected to be used in code 704 such that a reference to any of those data sources in code 704 will count as a connectivity reference from code 704.

As another example, input 708 may include details of a specification for calling a particular type of data source, such as Open Database Connectivity (ODBC) or Java Database Connectivity (JDBC) calls to databases. Such a specification allows connectivity analysis component 702 to identify connectivity logic in code 704. Of course, input 708 may include a combination of the name or details of any type or number of standards and specifications for implementation of code 704.

Using inputs 704, 706, and 708, connectivity analysis component 702 makes determination 710. Determination 710 may be a determination as to whether code 704 or a portion thereof uses a data source, such as by calling a database or opening a file in a file-system. Determination 710 may further be a determination as to whether a portion of code 704 includes such data source references exceeding a threshold value. The threshold value of references to external data sources can be 0 or any other value suitable for a given instance of code 704 in the data processing environment.

As an example embodiment, for those portions of code 704 where the connectivity calls exceed the threshold, connectivity analysis component 702 determines that those portions use a data source. For other portions of code 704, connectivity analysis component 702 determines that those portions do not use a data source.

Connectivity analysis component 702 produces a result of determination 710. In one embodiment, the result is a Boolean true/false (Yes, code 704 includes connectivity logic, or not). In another embodiment, the result may also identify the portions of code 704 that include the connectivity logic implementation.

Connectivity analysis component 702 also produces one or more recommendations. For example, connectivity analysis component 702 can recommend a placement on an integration platform for the portion of code 704 that includes connectivity logic. In one embodiment, a recommendation may also identify the portion of code 704 to which the recommendation pertains. In addition to the recommendation, connectivity analysis component 702 may also produce code for further review. As with granularity review component 602 in FIG. 6, in a sequence of analyses, connectivity analysis component 702 may provide the analyzed version of code 704 to another component of an analysis and recommendation component according to an embodiment. For example, connectivity analysis component 702 may provide code for further analysis to non-business-process related logic analysis component 410 in FIG. 4.

Figure 8:
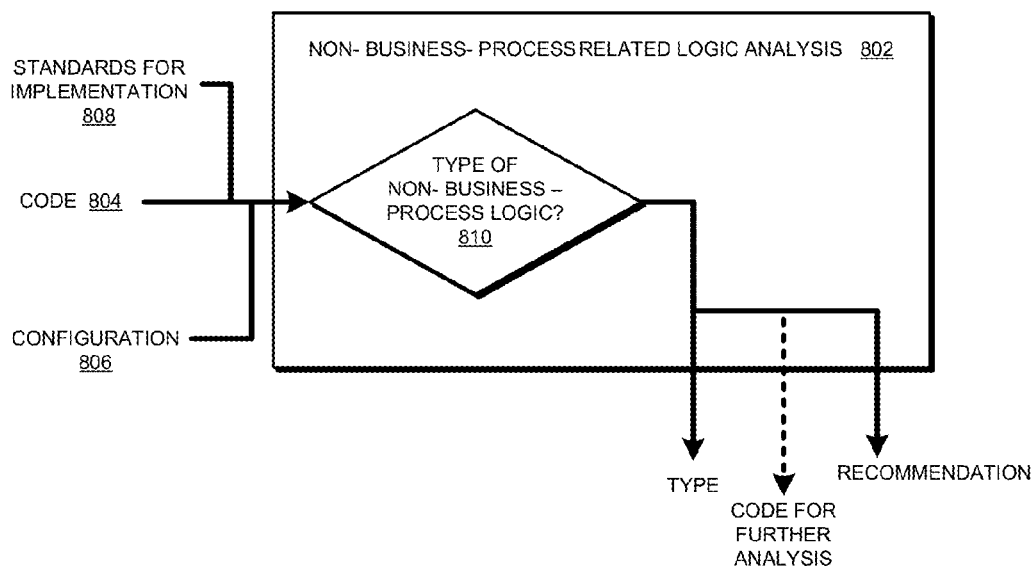
FIG. 8 depicts a block diagram of a non-business-process related logic analysis component in accordance with an illustrative embodiment.

With reference to FIG. 8, this figure depicts a block diagram of a non-business-process related logic analysis component in accordance with an illustrative embodiment. Non-business-process related logic analysis component 802 may be used as non-business-process related logic analysis component 410 in FIG. 4.

In one embodiment, non-business-process related logic analysis component 802 receives code 804, such as code 304 in FIG. 3 or code for further analysis from connectivity analysis component 702 in FIG. 7, as one input. Configuration 806 forms another input to non-business-process related logic analysis component 802. In one embodiment, configuration 806 may be similar to configuration 308 in FIG. 3. In another embodiment, configuration 806 may be similar to a part of configuration 308 in FIG. 3, for example, one or more of analysis tuning parameters 312 in FIG. 3 including a non-business-process related logic content threshold value. An example non-business-process related logic content threshold value may specify a number of lines of code excluding business process logic (business process logic may be identified in the manner described with respect to FIG. 5) in code 804.

Input 808 includes one or more manners of detecting the non-business-process related logic portions in code 804. For example, input 808 may include identifications of a collection of data repositories where error logs, performance logs, debugging messages, other instrumentation for gauging the operation of code 804, and other such non-business-process logic related information may be written from code 804. A reference to any of those data sources in code 804 can be identified as non-business-process related logic implementation in code 804.

As another example, input 808 may include details of a specification for specific function calls for performance and error handling instrumentation in code 804. Such a specification allows non-business-process related logic analysis component 802 to identify non-business-process related logic in code 804. Of course, input 808 may include a combination of the name or details of any type or number of standards and specifications for implementation of code 804.

Using inputs 804, 806, and 808, non-business-process related logic analysis component 802 makes determination

810. Determination 810 may be a determination of a type of non-business-process related logic present in code 804. For example, determination 810 may be a determination as to whether the non-business-process related logic relates to error handling and notification or performance metrics measurement. Determination 810 may further be a determination as to whether whether a portion of code 804 includes such non-business-process related logic exceeding a threshold value, such as a number of calls, or alternatively the number of lines of codes, for error handling or performance measuring instrumentation.

As an example embodiment, for the portions of code 804 where the non-business-process related logic is found, non-business-process related logic analysis component 802 outputs a type of non-business-process related logic being implemented. The type may be, for example, continuing the example above, "error handling code" or "performance measuring code."

Non-business-process related logic analysis component 802 also produces one or more recommendations. For example, non-business-process related logic analysis component 802 can recommend a placement using a performance measuring tool (performance measuring platform) for the portion of code 804 that includes code for performance metrics measurement. As another example, non-business-process related logic analysis component 802 can recommend a placement using an error handling tool (error handling platform) for the portion of code 804 that includes code for error handling and notification. In one embodiment, a recommendation may also identify the portion of code 804 to which the recommendation pertains.

In addition to the recommendation, non-business-process related logic analysis component 802 may also produce code for further review. As with connectivity analysis component 702 in FIG. 7, in a sequence of analyses, non-business-process related logic analysis component 802 may provide the analyzed version of code 804 to another analytical component (not shown) of an analysis and recommendation component according to an embodiment.

Figure 9:
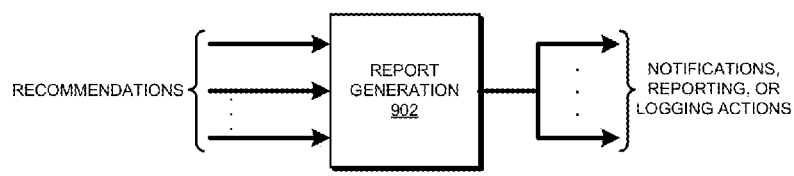
FIG. 9 depicts a block diagram of a report generation component in accordance with an illustrative embodiment.

With reference to FIG. 9, this figure depicts a block diagram of a report generation component in accordance with an illustrative embodiment. Report generation component 902 may be used as report generation component 412 in FIG. 4.

In one embodiment, report generation component 902 receives recommendations from the various steps or phases of analyses performed in an embodiment of an analysis and recommendation component. For example, in one embodiment, report generation component 902 receives recommendations generated from components 502, 602, 702, and 802 in FIGS. 5, 6, 7, and 8 respectively. As described earlier, some of the recommendations may be accompanied by portions of the code being analyzed.

Report generation component 902 produces one or more notification, reporting, or logging actions using the recommendations. For example, in one embodiment, report generation component 902 may generate a recommendation report and store the report in a database. In another embodiment, report generation component 902 may generate a recommendation report and send the report in an email. In another embodiment, report generation component 902 may notify an administrator of an improper placement and point to the recommendation report stored in a database for further information.

Figure 10:
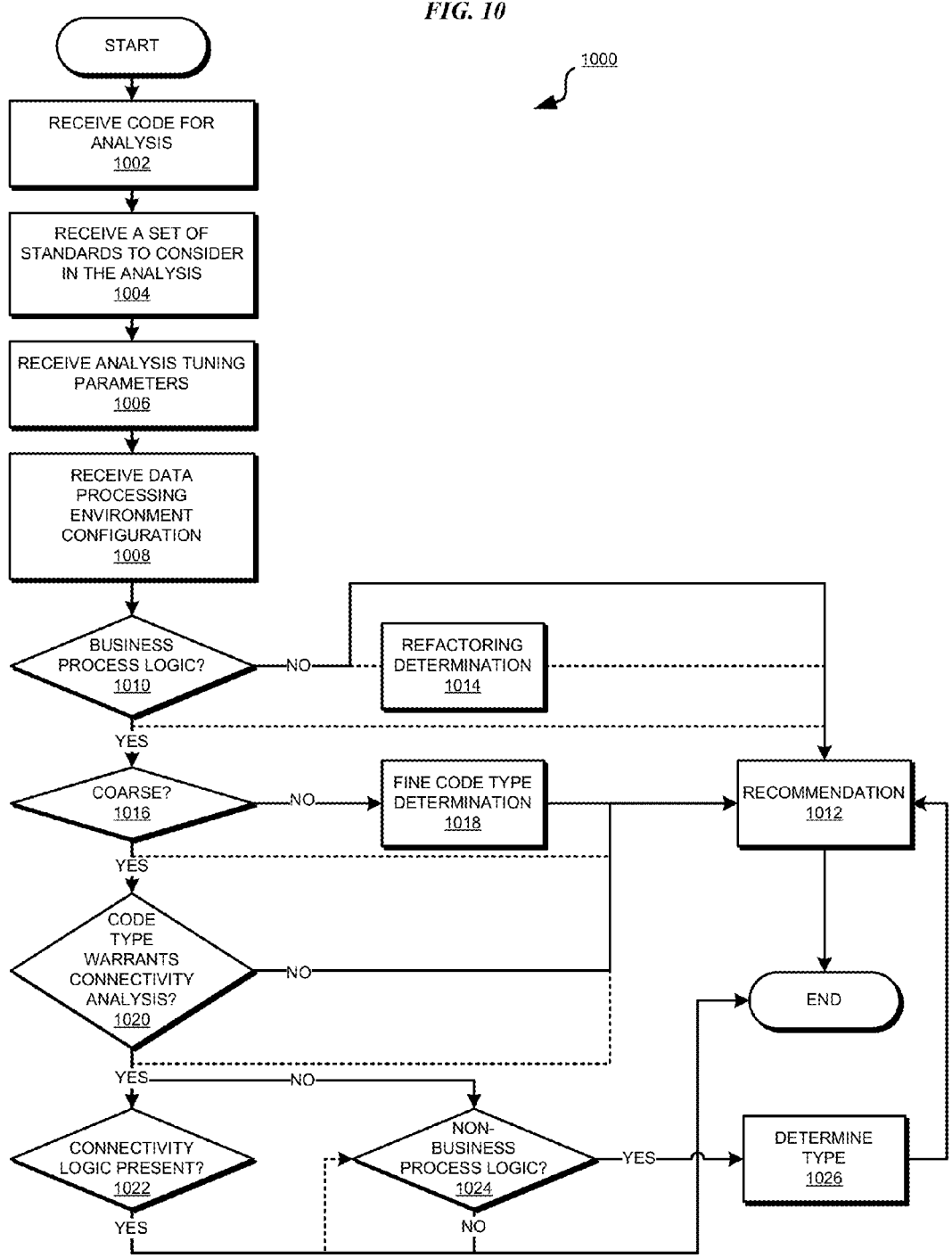
FIG. 10 depicts a flowchart of an example process of improving software component placement on execution platforms in accordance with an illustrative embodiment.

With reference to FIG. 10, this figure depicts a flowchart of an example process of improving software component placement on execution platforms in accordance with an illustrative embodiment. Process 1000 may be implemented in an analysis and recommendation component, such as in analysis and recommendation component 402 in FIG. 4.

The analysis and recommendation component receives code for analysis (block 1002). The analysis and recommendation component receives a set of industry standards to consider in the analysis (block 1004). The set of standards may be any combination of the standards or specifications or best practices for any combination of the components in the analysis and recommendation component as described in this disclosure.

The analysis and recommendation component further receives analysis tuning parameters (block 1006). The analysis and recommendation component also receives a data processing environment configuration pertaining to the data processing environment in which the received code of block 1002 is to be placed (block 1008).

The analysis and recommendation component determines whether the code includes business process logic (block 1010). For example, the analysis and recommendation component may make the determination of block 1010 in the manner described with respect to FIG. 5. If the analysis and recommendation component determines that the code does not include business process logic ("No" path of block 1010), the analysis and recommendation component may generate a recommendation for placement of the code on a particular platform (block 1012). The recommendation, for example, may be based on the standards and specifications received in block 1004 and the configuration information received in blocks 1006 and 1008.

Following the "No" path of block 1010, the analysis and recommendation component may also make a refactoring determination (block 1014). The analysis and recommendation component may output the result of the refactoring determination as a recommendation in block 1012 as well.

If the analysis and recommendation component determines that the code includes business process logic ("Yes" path of block 1010), the analysis and recommendation component may generate another recommendation for placement. The analysis and recommendation component continues to determine whether the code is coarse grained (block 1016). For example, the analysis and recommendation component may make the determination of block 1016 in the manner described with respect to FIG. 6.

If the code is not coarse grained, in other words, if the code is fine grained ("No" path of block 1016), the analysis and recommendation component determines a code type of the fine grained code (block 1018). For example, the fine grained code may be Java code that should be placed on a specific platform for improved performance. Accordingly, the analysis and recommendation component may generate a recommendation at block 1012.

If the code is coarse grained, the analysis and recommendation component may generate another recommendation for placement. The analysis and recommendation component continues to determine whether the code type of the coarse code warrants connectivity analysis (block 1020). For example, the specification input to the analysis and recommendation component may specify that certain remote Java libraries (and the objects within) or databases can be accessed from the code via a network path. If the code is coarse grained, the analysis and recommendation component may determine that it is likely that the code includes connectivity to those Java libraries or databases, and perform block 1020.

If the coarse grained code does not warrant connectivity analysis ("No" path of block 1020), the analysis and recommendation component may generate a recommendation for placement of the coarse grained code at block 1012. If the coarse grained code warrants connectivity analysis ("Yes" path of block 1020), the analysis and recommendation component determines whether connectivity logic is present in the code (block 1022). For example, the analysis and recommendation component may make the determination of block 1022 in the manner described with respect to FIG. 7.

If connectivity logic is present ("Yes" path of block 1022), the analysis and recommendation component may generate a recommendation for placement of the connectivity logic in the code at block 1012. The analysis and recommendation component may then proceed to determine whether non-business-process related logic is present in the code (block 1024). If connectivity logic is not present in the code ("No" path of block 1022), the analysis and recommendation component proceeds to block 1024.

If the analysis and recommendation component determines that non-business-process related logic is not present in the code ("No" path of block 1024), process 1000 may end thereafter, or continue to another analytic function as will be conceivable from this disclosure to those of ordinary skill in the art.

If the analysis and recommendation component determines that non-business-process related logic is present in the code ("Yes" path of block 1024), the analysis and recommendation component determines a type of the non-business-process related logic code (block 1026). The analysis and recommendation component may generate a recommendation for placement of the different types of non-business-process related logic code differently at block 1012. Process 1000 ends thereafter.

Figure 11:
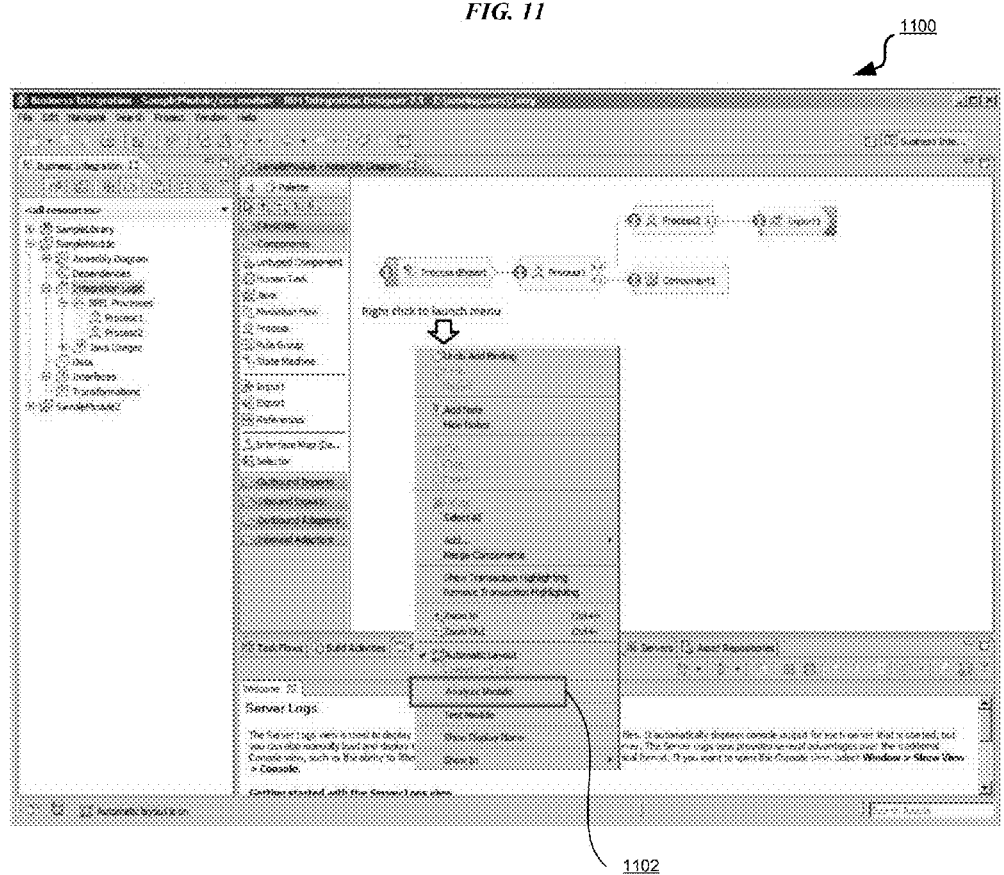
FIG. 11 depicts a screen-captured image of integrating an analysis and recommendation component with an existing tool in accordance with an illustrative embodiment.

With reference to FIG. 11, this figure depicts a screen-captured image of integrating an analysis and recommendation component with an existing tool in accordance with an illustrative embodiment. The analysis and recommendation component being integrated may be the analysis and recommendation component that implements process 1000 in FIG. 10.

For a software component, a module, an existing tool, such as a business integration tool, may be modified with an embodiment of an analysis and recommendation component to provide additional placement related features. For example, feature 1102 allows a user to analyze the module in the manner of an embodiment described herein from within the business integration tool.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for improving software component placement on software execution platforms. An embodiment may make the placement recommendations based on industry best practices. An embodiment allows users to apply the improved placement technique across multiple projects, with different software components and possibly different platform configurations in the data processing environment. An embodiment may help in significantly reducing the time cost of performance degradation by minimizing manual analysis of the code. An embodiment may also help users in selecting a suitable platform for implementation during the design and build phases of a software component. An embodiment may also assist in correcting improper placement of existing code. Thus, an embodiment can help in improving the overall performance of the data processing environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable tangible storage device," "computer readable storage device," and computer-readable storage device" do not encompass a signal propagation medium such as a copper cable, optical fiber, or wireless transmission medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for improving the placement of a software component on a set of software execution platforms, the method comprising:
    a computer determining whether a code corresponding to the software component includes business process logic;
    the computer identifying, using a specification, and responsive to determining that the code includes business process logic, external references coded into the code, the specification describing a type of objects to which references can be coded into the code, wherein an external reference comprises a reference to an object of the type coded in the code;
    the computer determining a granularity level of the code, wherein the granularity level of the code is a categorization of the code according to whether a number of external references coded in the code exceed a threshold value; and
    the computer, responsive to determining the granularity level of the code, recommending placement of a first portion of the code on a first platform in the set of software execution platforms.

2. The method of claim 1, further comprising:
    the computer determining whether connectivity logic is present in the code; and
    the computer responsive to the connectivity logic being present in the code, recommending placement of a second portion of the code including the connectivity logic on a second platform in the set of software execution platforms.

3. The method of claim 1, further comprising:
    the computer determining whether non-business-process related logic is present in the code; and
    the computer responsive to the non-business-process related logic being present in the code, recommending placement of a third portion of the code including the non-business-process related logic on a third platform in the set of software execution platforms.

4. The method of claim 3, further comprising:
    the computer determining a type of the non-business-process related logic present in the code; and
    the computer responsive to the non-business-process related logic being of error handling type, recommending placement of a fourth portion of the code including the error handling type non-business-process related logic on a fourth platform in the set of software execution platforms.

5. The method of claim 3, further comprising:
    the computer determining a type of the non-business-process related logic present in the code; and
    the computer responsive to the non-business-process related logic being of performance metrics measurement type, recommending placement of a fifth portion of the code including the performance metrics measurement type non-business-process related logic on a fifth platform in the set of software execution platforms.

6. The method of claim 1, further comprising:
    the computer, responsive to determining that the code does not include business process logic, recommending refactoring the code; and
    the computer further recommending placement of a sixth portion of the code on a sixth platform in the set of software execution platforms.

7. The method of claim 1, further comprising:
the computer receiving identification of implementation standards in a set of standards used in the code;
the computer using an identification of an implementation standard in the set of standards to determine that the code includes business process logic.

8. The method of claim 7, wherein the identification of the implementation standard is BPEL.

9. The method of claim 1, further comprising:
the computer receiving a set of analysis tuning parameters;
the computer using an analysis tuning parameter in the set of analysis tuning parameters to determine that the code includes business process logic.

10. The method of claim 9, wherein the analysis tuning parameter is the threshold value, wherein the granularity level of the code is fine grained when the code implements logic of an object, wherein the granularity level of the code is coarse grained when the code references the object outside the code, further comprising:
the computer determining that the code is coarse grained when a number of references to the object exceeds the threshold value.

11. A computer program product comprising one or more computer-readable, tangible storage devices and computer-readable program instructions which are stored on the one or more storage devices and when executed by one or more processors, perform the method of claim 1.

12. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

13. A computer program product for improving the placement of a software component on a set of software execution platforms, the computer program product comprising:
one or more computer-readable tangible storage devices;
program instructions, stored on at least one of the one or more storage devices, to determine whether a code corresponding to the software component includes business process logic;
program instructions, stored on at least one of the one or more storage devices, to identify, using a specification, and responsive to determining that the code includes business process logic, external references coded into the code, the specification describing a type of objects to which references can be coded into the code, wherein an external reference comprises a reference to an object of the type coded in the code;
program instructions, stored on at least one of the one or more storage devices, to determine a granularity level of the code, wherein the granularity level of the code is a categorization of the code according to whether a number of external references coded in the code exceed a threshold value; and
program instructions, stored on at least one of the one or more storage devices, to, responsive to determining the granularity level of the code, recommend placement of a first portion of the code on a first platform in the set of software execution platforms.

14. The computer program product of claim 13, further comprising:
program instructions, stored on at least one of the one or more storage devices, to determine whether connectivity logic is present in the code; and
program instructions, stored on at least one of the one or more storage devices, to, responsive to the connectivity logic being present in the code, recommend placement of a second portion of the code including the connectivity logic on a second platform in the set of software execution platforms.

15. The computer program product of claim 13, further comprising:
program instructions, stored on at least one of the one or more storage devices, to determine whether non-business-process related logic is present in the code; and
program instructions, stored on at least one of the one or more storage devices, to, responsive to the non-business-process related logic being present in the code, recommend placement of a third portion of the code including the non-business-process related logic on a third platform in the set of software execution platforms.

16. The computer program product of claim 15, further comprising:
program instructions, stored on at least one of the one or more storage devices, to determine a type of the non-business-process related logic present in the code; and
program instructions, stored on at least one of the one or more storage devices, to, responsive to the non-business-process related logic being of error handling type, recommend placement of a fourth portion of the code including the error handling type non-business-process related logic on a fourth platform in the set of software execution platforms.

17. The computer program product of claim 15, further comprising:
program instructions, stored on at least one of the one or more storage devices, to determine a type of the non-business-process related logic present in the code; and
program instructions, stored on at least one of the one or more storage devices, to, responsive to the non-business-process related logic being of performance metrics measurement type, recommend placement of a fifth portion of the code including the performance metrics measurement type non-business-process related logic on a fifth platform in the set of software execution platforms.

18. The computer program product of claim 13, wherein the program instructions to determine whether the code corresponding to the software component includes business process logic, the program instructions to identify, the program instructions to determine the granularity level of the code, and the program instructions to recommend are stored in the one or more computer-readable tangible storage devices in a data processing system, and wherein the program instructions to determine whether the code corresponding to the software component includes business process logic, the program instructions to identify, the program instructions to determine the granularity level of the code, and the program instructions to recommend are transferred over a network from a remote data processing system.

19. The computer program product of claim 13, wherein the program instructions to determine whether the code corresponding to the software component includes business process logic, the program instructions to identify, the program instructions to determine the granularity level of the code, and the program instructions to recommend are stored in the one or more computer-readable tangible storage devices in a server data processing system, and wherein the program instructions to determine whether the code corresponding to the software component includes business process logic, the program instructions to identify, the program instructions to determine the granularity level of the code, and the program instructions to recommend are downloaded over a network to a remote data processing system for use in a computer-readable tangible storage device associated with the remote data processing system.

20. A computer system for improving the placement of a software component on a set of software execution platforms, the computer system comprising:

one or more processors, one or more computer-readable memories and one or more computer-readable tangible storage devices;

program instructions, stored on at least one of the one or more storage devices, to determine whether a code corresponding to the software component includes business process logic;

program instructions, stored on at least one of the one or more storage devices, to identify, using a specification, and responsive to determining that the code includes business process logic, external references coded into the code, the specification describing a type of objects to which references can be coded into the code, wherein an external reference comprises a reference to an object of the type coded in the code;

program instructions, stored on at least one of the one or more storage devices, to determine a granularity level of the code, wherein the granularity level of the code is a categorization of the code according to whether a number of external references coded in the code exceed a threshold value; and program instructions, stored on at least one of the one or more storage devices, to, responsive to determining the granularity level of the code, recommend placement of a first portion of the code on a first platform in the set of software execution platforms.

* * * * *